(No Model.)
A. C. BRADLEY.
PROCESS OF MAKING WHITE LEAD.
No. 434,623. Patented Aug. 19, 1890.
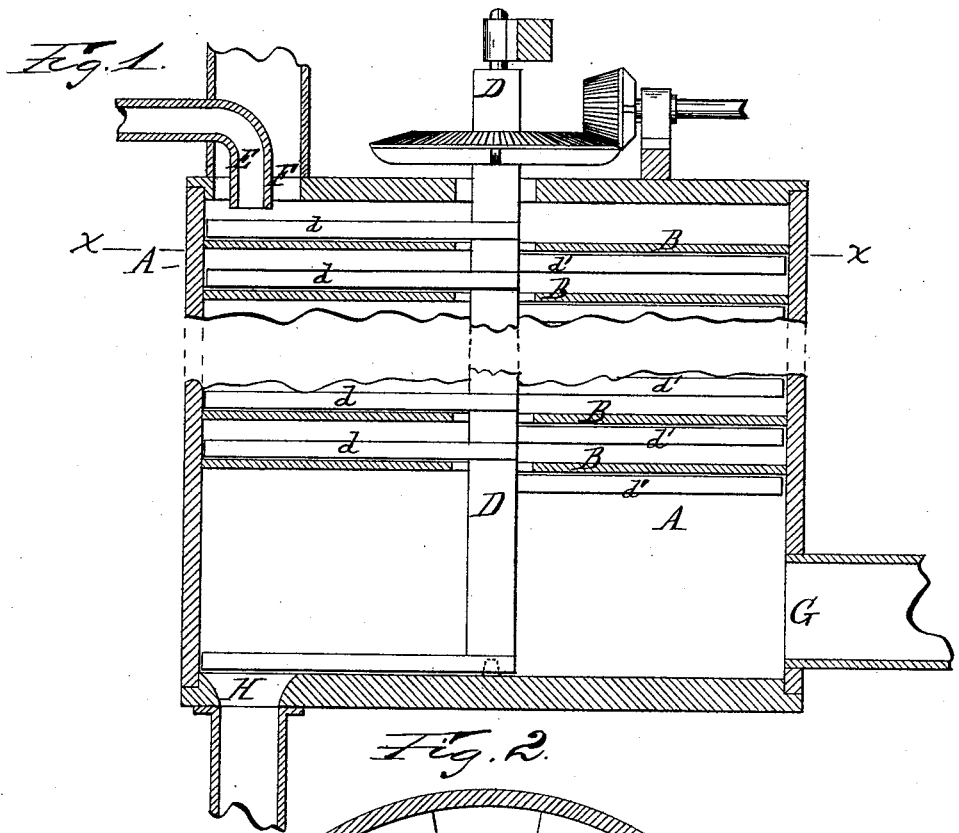
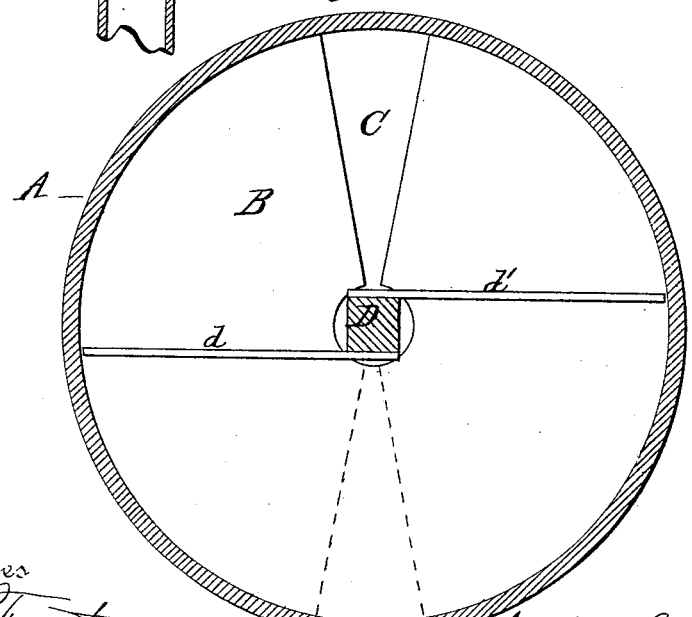
Witnesses
Inventor
Arthur Crofman Bradley
By his Attorney

UNITED STATES PATENT OFFICE.

ARTHUR CROSSMAN BRADLEY, OF BROOKLYN, NEW YORK.

PROCESS OF MAKING WHITE LEAD.

SPECIFICATION forming part of Letters Patent No. 434,623, dated August 19, 1890.

Application filed August 19, 1887. Serial No. 247,333. (Specimens.)

*To all whom it may concern:*

Be it known that I, ARTHUR CROSSMAN BRADLEY, of Brooklyn, in the county of Kings and State of New York, have made an invention of certain new and useful Improvements in the Process of Manufacturing White Lead; and I do hereby declare that the following, in connection with the accompanying drawings, is a full, clear, and exact description and specification of the same.

The improvements which constitute the subject-matter of this patent have reference to the manufacture of white lead by the liquid process, in which a solution of the basic acetate of lead is subjected to the action of carbonic-acid gas; and the practical effect of the improvements is the rapid production of white lead of the highest quality which, so far as the inventor has been able to ascertain, has hitherto been produced in manufacturing in a large way.

In order that the invention may be practiced, various apparatuses are necessary for preparing and heating the solution of acetate of lead; for preparing carbonic-acid gas; for washing said gas; for heating it, and for subjecting the solution to the action of the gas; and as apparatuses are in use for the same or similar purposes which can be successfully used in practicing my invention, it is not necessary to describe any of them in detail. As, however, the best converting apparatus with which I am acquainted for the purpose of subjecting the solution to the action of carbonic-acid gas is one which is the joint invention of myself and Stephen Rowe Bradley, I have represented it in the accompanying drawings, and will proceed to describe it before describing the best mode which I have thus far devised for practicing my invention, it being understood that the same may be modified as circumstances or the views of users may render expedient.

Figure 1 of said drawings represents a central vertical section of the said converting apparatus with certain parts in elevation. Fig. 2 represents a transverse section of the same at the line $x\ x$ of Fig. 1.

The converting-chamber A of the said apparatus is cylindrical, and may be of any convenient size, that which I have used successfully being six feet in diameter and twenty feet high. It is fitted internally with a series of shelves B B, each of which is partly cut away at one side, so as to form an opening C, through which the solution may escape to the next shelf beneath, and the openings of the shelves are not directly above one another, so that the solution flowing through the opening of one shelf is compelled to traverse the next beneath, or a material portion of it. The opening is large enough at the center of each shelf to permit the revolution of an upright shaft D, whose upper end is extended through the top of the chamber, and is connected with mechanism by means of which it is caused to revolve slowly. This shaft is fitted with arms $d\ d'$, which are revolved with it, and it is preferred that there should be one arm $d$ adjusted to revolve near the top of each shelf, and one arm $d'$ adjusted to revolve near the bottom of each shelf, so that the arms in their revolution may sweep or scrape off such white lead as accumulates upon the shelves.

The upper end of the converting-chamber is fitted with a pipe E for supplying the solution, and with an opening F for the escape of gases.

The lower end of the converting-chamber is provided with an opening G for the introduction of carbonic-acid gas, and with an escape opening or a pipe H for the escape of the solution of acetate of lead and of the white lead which is mechanically mixed with it.

The upright sides of the apparatus may be provided with openings fitted with doors, so that the interior may be cleansed when found expedient.

The solution of acetate of lead may be prepared from the following ingredients in the following proportions: Six and one-fourth pounds of commercial acetic acid of twenty-eight per cent. strength; three and one-fourth pounds litharge (oxide of lead;) ninety and one-half pounds water. These proportions produce a preparatory solution of acetate of lead containing about five per cent. of acetate, and it is treated with an additional quantity of litharge until it attains a specific gravity of about 13° Baumé, when it contains about eleven per cent. of the basic acetate of lead.

The preparatory solution when first made according to my invention should not contain less than four per cent. of the acetate nor more than five and one-half per cent. The carbonic-acid gas may be prepared in any of the usual ways; but it is important that when made from mineral coal it should be washed before it is introduced into the converting-chamber. Such washing may be effected by causing the gas to pass through a chamber containing a mass of broken bricks which are sprayed with water.

The carbonic-acid gas is conducted by a pipe to the opening G at the bottom of the converting-chamber, and the solution of lead is conducted to the nozzle E at the top of the chamber, so that the gas and solution pass through the chamber in opposite directions. In carrying out my invention the lead solution is subjected to the action of heat above that of the atmosphere, as well as to that of the gas, and the most convenient mode of applying the heat is to heat both the gas and the solution of the acetate before introducing them into the converting-chamber. For this purpose I use the gas while hot from its manufacture from burning coal, the temperature to which the gas should be heated when it enters the converting chamber being about 120° Fahrenheit. The solution of the basic acetate should also be heated to the same temperature (120° Fahrenheit) before being introduced into the converting-chamber; but as the object of heating the gas and solution is that the temperature of treatment in the converting-chamber should be about 120°, this result may be attained by heating one of the said articles only, or both articles, as found convenient, before their introduction to such temperature that the temperature in the converting-chamber will be 120° Fahrenheit, or thereabout.

The solution which enters the converting-chamber flows in succession over each of the shelves thereof in a thin sheet, and as these sheets or layers expose a large surface of liquid to the action of the gas, the liquid is subjected simultaneously to the action of the gas and of the heat, which is maintained in the chamber by heating one or both (and preferably both) the ingredients before they enter it. The flow of the solution is controlled by a valve in the supply-pipe, and is at such a rate that about half of the basic acetate of lead in the solution is converted into carbonate of lead when the solution leaves the converting-chamber, so that the process stops at this point. The solution as it flows through the converting-chamber carries more or less of the white lead with it, and such white lead as accumulates upon the shelves is swept off by the revolving arms $d\,d'$ and discharged with the spent solution. The mixture of white lead and spent solution is permitted to settle in a tank. The liquid is then drawn off and recharged with lead by treating it with a fresh quantity of litharge, so as to restore its specific gravity to about 13° Baumé, when it is again passed through the converting-chamber. The deposited white lead may be treated as is customary in the manufacture from a solution of basic acetate.

The white lead manufactured by the above process is amorphous, and contains an exceptionally-large proportion of the hydrated oxide of lead, amounting to as much as thirty-seven per cent. As it is to this oxide that the so-called "body" of white lead is generally attributed, the white lead produced by my process is of superior value for painting.

The manufacture of white lead by the above-described process is not limited to the form of apparatus employed for the purpose, nor to the precise mode in which the solution of the basic acetate is prepared. Thus practically the same solution of basic acetate of lead may be prepared by stirring together the following ingredients, viz: Water, one hundred gallons; commercial acetic acid of twenty-eight per cent. strength, forty-six and one-half pounds; litharge, eighty-five pounds. The solution of basic acetate made in this mode contains about eleven per cent. of the basic acetate of lead, and it is of a specific gravity of about 13° Baumé, as previously described, and I have reason to believe that in the chemical action which takes place neutral acetate forms first and is then converted into the basic acetate by the action of the litharge present.

I claim as my invention—

1. The process, substantially as before set forth, of manufacturing white lead, which consists in subjecting a solution of the basic acetate of lead containing between ten and twelve per cent. of the basic acetate of lead in a slowly-moving thin sheet to the joint action of carbonic-acid gas and heat.

2. The process, substantially as before set forth, of manufacturing white lead, which consists in subjecting a solution of the basic acetate of lead containing between ten and twelve per cent. of the basic acetate of lead in a thin sheet to the joint action of heat of about 120° Fahrenheit and carbonic-acid gas.

In witness whereof I have hereto set my hand this 17th day of August, A. D. 1887.

ARTHUR CROSSMAN BRADLEY.

Witnesses:
JOHN B. FROTHINGHAM,
FREDK. J. SHARP.